United States Patent [19]

Pearl

[11] 4,048,891
[45] Sept. 20, 1977

[54] CUTTER MECHANISM FOR CUTTING SHEET MATERIAL

[75] Inventor: David R. Pearl, West Hartford, Conn.

[73] Assignee: Gerber Garment Technology, Inc., East Hartford, Conn.

[21] Appl. No.: 735,750

[22] Filed: Oct. 26, 1976

[51] Int. Cl.$^2$ .......................... D06H 7/00; B26D 1/10
[52] U.S. Cl. .......................... 83/528; 74/25; 83/628; 83/632; 83/925 CC
[58] Field of Search ................. 83/528, 628, 630, 632, 83/925 CC; 30/273, 275; 74/25, 38, 40

[56] References Cited
U.S. PATENT DOCUMENTS
850,927  4/1907  Gury ................................. 30/275

Primary Examiner—J. M. Meister
Attorney, Agent, or Firm—McCormick, Paulding & Huber

[57] ABSTRACT

A cutter having a reciprocating knife for cutting sheet material has a drive mechanism for converting the rotary motion of a drive member into the reciprocating motion of the knife. The drive mechanism is comprised of a mechanical linkage which causes the forces applied to the upper end of the knife to be directed substantially along the axis of reciprocation and to, therefore, have very small lateral components minimizing wear between the knife guiding surfaces. The drive mechanism basically includes an eccentric drive pin which through a connecting link oscillates a pivotal crossarm. The oscillating movement of the crossarm is in turn imparted to the knife by means of an intermediate link connected between the crossarm and knife.

8 Claims, 3 Drawing Figures

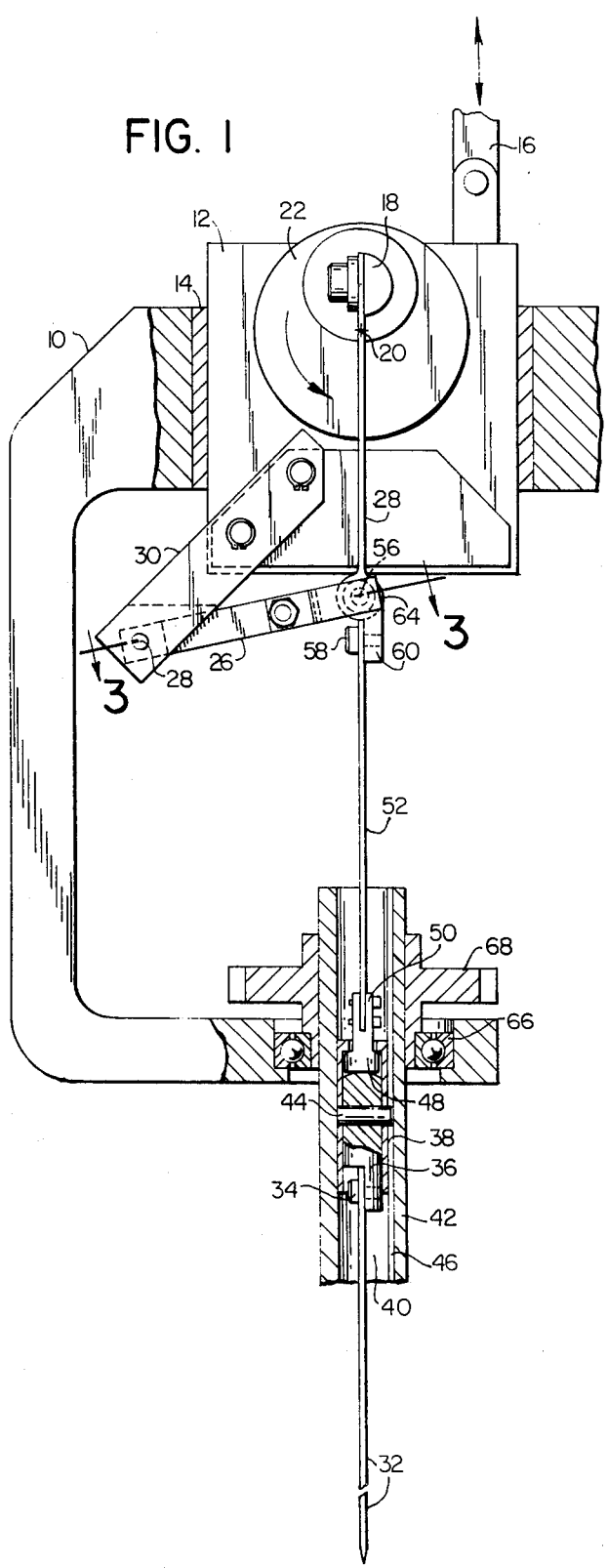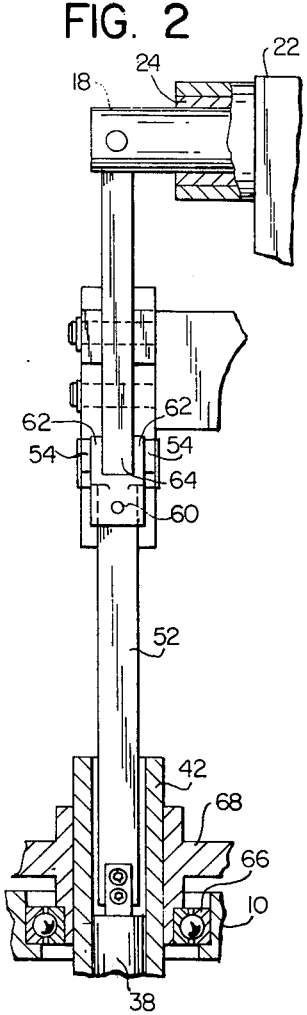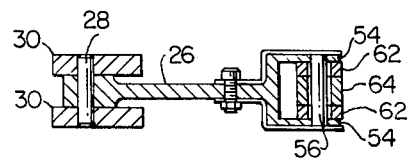

CUTTER MECHANISM FOR CUTTING SHEET MATERIAL

BACKGROUND OF THE INVENTION

This invention relates to cutters of the kind having reciprocating knives and commonly used for cutting sheet material such as layups of fabric used for garments or upholstry, and deals more particularly with the drive mechanism of such a cutter for converting the rotary motion of a drive member into the reciprocating motion of the knife.

Reciprocating knife cutters conventionally drive the knife by means of a simple drive linkage consisting of a connecting link or rod connected between a driving eccentric pin or the like and the associated end of the knife. Such a drive mechanism, however, during various portions of each cycle of reciprocation imposes relatively large lateral forces on the connection between the connecting rod and the knife and, therefore, requires a relatively sturdy structure to resist such forces and generates a high degree of wear between the relatively moving parts. These lateral forces and the fact that the connecting rod has a substantial range of angular movement relative to the knife during each reciprocation cycle also complicates matters in cases where it is desired to rotate the knife about its axis of reciprocation relative to the connecting rod.

Further, knife driving mechanisms conventionally used in the past have tended to be relatively massive, bulky and subject to vibration problems.

The general object of this invention is, therefore, to provide a knife driving mechanism for a sheet material cutter which mechanism may be made of a relatively small size and light weight construction, which is relatively smooth in operation, which minimizes wear between the surfaces which guide the knife in its reciprocating movement, and which is suited to relatively high speed operation.

In particular, another object of this invention is to provide a drive mechanism of the foregoing character wherein the drive forces imposed on the knife occur substantially along its axis of reciprocation and whereby such result is achieved by means of only a small number of parts of simple construction and arrangement.

A still further object of this invention is to provide a drive mechanism for a reciprocating knife which lends itself to combination with other parts for rotating the knife about its axis of reciprocation and/or for raising and lowering the knife to bring it into and out of cutting relationship with the material being cut or to adjust the depth of knife penetration, as may be desired in the case where the cutter is part of an automatically controlled cutting system, such as shown in U.S. Pat. No. 3,548,697, wherein it is mounted on a carriage located above the surface of the material being cut and automatically moved relative thereto in a plane parallel to such surface.

Other objects and advantages of the invention will be apparent from the drawing and from the following detailed description of the preferred embodiment.

SUMMARY OF THE INVENTION

The invention resides in the mechanism of a sheet material cutter for converting the motion of an eccentric or other drive pin, movable in a circular path about a given crank axis, into reciprocating motion of a knife, the drive mechanism including a crossarm supported for pivotal movement about a crossarm pivot axis fixed relative to the crank axis of the drive pin and oscillated about such pivot axis by a connecting link connected between it and the drive pin. In turn, an intermediate link is connected between the crossarm and the associated end of the knife for reciprocating the knife in response to the oscillating movement of the crossarm. The displacement of the drive pin from the crank axis, the displacement of the point of connection of the connecting link to the crossarm from the crossarm pivot axis, the displacement of the point of connection of the intermediate link to the crossarm from the crossarm pivot axis, and the location of the crossarm pivot axis are such that the point of connection between the intermediate link and the crossarm is located substantially on the axis of knife reciprocation and in its oscillatory movement moves substantially along such axis of reciprocation to cause the motion of the intermediate link to be substantially translation with very little rotation.

The invention also resides in a form of swivel connection between the intermediate link and the adjacent end of the knife to permit rotation of the knife about its axis of reciprocation relative to the intermediate link while at the same time permitting a small amount of angular movement between the knife and the intermediate link to accommodate the small amount of such motion as is required by the drive mechanism.

The invention still further resides in the parts of the drive mechanism being combined and arranged with other parts so as to allow the knife to be rotated, and also to be raised or lowered relative to a basic frame, carriage or other supporting structure to bring the knife into or out of cutting relationship with the material being cut, as in the case of the cutter being used as part of a cutting system where it is carried by a frame or carriage spaced above the surface of the material being cut and movable relative thereto in a plane parallel to said surface.

BRIEF DESCRIPTION OF THE DRAWING

FIG. 1 is an end view, partly in elevation and partly in section, showing a cutter mechanism embodying this invention.

FIG. 2 is a side view, partly in section and partly in elevation, taken looking toward the right side of the cutter mechanism as seen in FIG. 1.

FIG. 3 is a sectional view taken on the line 3—3 of FIG. 1.

DESCRIPTION OF THE PREFERRED EMBODIMENT

Turning to the drawing, a cutter mechanism embodying the invention is thereshown supported by a frame 10 which may, for example, be the work carriage of an automatic cutting machine, such as shown in U.S. Pat. No. 3,548,697, for moving the cutter in X and Y coordinate directions in a plane parallel to the surface of the material being cut. The cutter itself includes a subframe 12 supported by a bearing 14 for vertical movement, as seen in FIG. 1, relative to the frame 10. The vertical positioning of the subframe 12 relative to the frame 10 may be achieved in various different ways as, for example, by means of a link 16 connected to a solenoid, cam or other suitable device, not shown, for raising and lowering the link to in turn raise and lower the subframe 12.

The subframe 12 carries a drive pin 18 supported for motion in a circular path about a horizontal crank axis 20 fixed relative to the subframe. The drive pin may take various different forms without departing from the invention, but in the illustrated case, is a pin carried by a flywheel 22. The flywheel is in turn rotatably supported for rotation about the crank axis 20 relative to the subframe and is driven in rotation about such axis by an associated drive motor or other suitable drive means, not shown. The drive pin 18 is arranged eccentrically on the flywheel 22 and is supported for rotation about its own axis relative to the flywheel by a bearing 24.

Below the drive pin 18 is a crossarm 26 supported for movement relative to the subframe 12 about a crossarm pivot axis defined by a pivot pin 28 carried by a bracket 30 fixed to the subframe. The crossarm 26 is in turn oscillated about the crossarm pivot axis, in response to repeated orbiting of the drive pin 18 about the crank axis 20, by a connecting link 28 connected between the drive pin 18 and the crossarm 26.

Below the crossarm 26 is a cutting knife or blade 32. The knife is vertically elongated, may be of various suitable shapes, and in most cases will have a sharpened forward vertical cutting edge and a sharpened downwardly facing cutting edge at its lower end. At its upper end, the knife is attached by a screw 34 to the body 36 of a swivel device. The swivel device also includes a cylindrical hollow slide member 38 which receives the body 36, and the slide member 38 is in turn slidably received in the bore 40 of a guide tube 42. The body 36 and slide member 38 are held in assembly by a pin 44 which at its right-hand end, as seen in FIG. 2, extends slightly beyond the outer surface of the slide 38 and is received in an elongated slot 46 in the bore 40 of the tube 42. The upper end of the slide 38 extends above the upper end of the body 36 and loosely but captively receives, as shown in FIG. 1, the enlarged diameter lower end 48 of a connector 50. The connector 50 may therefore be rotated about a vertical axis relative to the slide 38, body 36 and knife 32 and may also move a small amount angularly relative to the body 36 and slide 38. To facilitate this angular movement, the upper end of the body 36 is preferably rounded, as seen in FIG. 1, as are also preferably rounded the upwardly facing surface of the enlarged head 48 and the cooperating downwardly facing surface of the upper end portion of the slide 38.

The knife 32 is connected to the crossarm 26, through the swivel device described in the preceding paragraph, by an intermediate link 52 connected between the crossarm and the connecting part 50 of the swivel device. Therefore, as the crossarm oscillates, the knife is reciprocated along a vertical axis of reciprocation, as seen in FIG. 1, with the slide member 38 of the swivel device sliding along the bore 40 of the tube 42 as part of such reciprocation.

The point of connection of the intermediate link 52 to the crossarm 26 may be different from the point of connection of the connecting rod 28 to the crossarm so that such points of connection are displaced different distances from the pivot pin 28, but preferably, and as illustrated, these two connecting points are coincident and share a common pivot axis. In particular, as shown best in FIGS. 2 and 3, at its oscillating end the crossarm 26 is shaped to define two spaced fingers 54, 54 supporting between them a pivot pin 56. The upper end of the intermediate link is connected by a screw 58 to a connecting part 60 having two spaced ears 62, 62 pivotally attached to the pin 56 by suitable bearings. The lower end 64 of the connecting link 28 is received between the ears 62, 62 and is likewise pivotally attached to the pin 56 by a suitable bearing.

From inspection of FIG. 1, it will be noted that the point at which the intermediate link 52 is connected to the crossarm 26 is located directly above the knife 32 and substantially on the axis of knife reciprocation. Further, it will be readily seen that the location of the crossarm pivot pin 28, the radius of the drive pin 18 circular path of movement, the displacement of the connecting point between the connecting link and the crossarm from the pivot pin 28, and the displacement of the connecting point between the intermediate link 52 and the crossarm from the crossarm pivot pin 28 are such that as the crossarm 26 is oscillated by the drive pin, the connecting point between the intermediate link 52 and the crossarm 26, that is, the locus of the pivot pin 56, remains substantially on the axis of reciprocation of the knife 32. Therefore, as the intermediate link 52 is moved up and down to reciprocate the knife, it moves substantially in translation with very little angular movement occurring between it and the knife. Accordingly, the driving forces imposed by the intermediate link on the swivel device occur substantially in line with the axis of reciprocation and have only very small lateral or horizontal components. Thus, no large lateral forces are transmitted between the relatively sliding outer surface of the slide 38 and the inner bore 40 of the tube 42 and wear and binding between these surfaces is minimized. In particular, in a construction such as illustrated, where the connecting link 28 and intermediate link 52 share a common pivot axis relative to the crossarm 26, such common pivot axis remains acceptably close to the axis of knife reciprocation throughout each cycle of reciprocation if the displacement of of such common pivot axis from the crossarm pivot axis, as measured perpendicular to the axis of knife reciprocation, is greater than the diameter of the circular path of the drive pin 18.

To allow rotation of the knife 32 about its axis of reciprocation relative to the intermediate link 52 and frame 10, the guide tube 42 is supported for rotation about the axis of knife reciprocation by a bearing 66 and is movable to selected angular positions by a sprocket wheel or gear 68 fixed to the tube 42 and positioned by a suitable drive mechanism, not shown. As the tube 42 is rotated, the engagement of the pin 44 with the walls of the slot 46 cause the pin 44, the swivel body 46 and the swivel slide 38 to be rotated with the tube 44 and to similarly rotate the knife 32. The connecting part 48, however, remains angularly fixed and the slide 38, body 36, knife 32 and tube 42 rotate relative to it.

It will also be noted that as the subframe 12 is moved up and down relative to the frame 10 by the raising and lowering link 16, the swivel device and knife 32 are moved to different fundamental positions relative to the tube 42 to cause the knife to be raised and lowered relative to the frame 10 to either move it into or out of cutting relation to the material being cut or to adjust its depth of penetration.

In the device illustrated by the drawing, the knife 32 is shown to be guided in its reciprocating motion at its upper end by virtue of its attachment to the swivel device which is guidingly supported by the tube 42. Additional guide means, if desired, may also be provided for guidingly supporting the knife along all or part of its length, such guides being well known in the art and not shown in the drawing.

Also, in the illustrated device, the slight angular movement of the intermediate link 52 relative to the knife 32 which does occur during operation is accommodated by the design of the swivel device which permits the connector 50 to move angularly relative to the swivel parts 36 and 38. However, this arrangement is not necessary to the broader aspects of the invention and, if desired, the swivel device may be designed so as not to accommodate such angular movement with the angular movement instead being taken care of by flexing of the intermediate link 52.

I claim:

1. A cutter mechanism for cutting sheet material, said cutter mechanism comprising: a drive pin movable in a circular path about a given crank axis, a crossarm supported at one of its ends for pivotal movement about a crossarm pivot axis fixed relative to and parallel to said crank axis, a connecting link connected between said drive pin and the other end of said crossarm for oscillating said crossarm about said crossarm pivot axis in response to travel of said drive pin repeatedly about said circular path, a knife supported for movement along a knife axis fixed relative to said crank and pivot axes and located in a plane perpendicular to said crank and crossarm pivot axes, and an intermediate link connected between said other end of said crossarm and said knife for reciprocating said knife along said knife axis in response to oscillation of said crossarm about said crossarm pivot axis.

2. A cutter mechanism as defined in claim 1 further characterized by means connecting said intermediate link to said knife whereby said intermediate link is movable relative to said knife about an axis fixed relative to said intermediate link and said knife and oriented parallel to said crank and said crossarm pivot axes.

3. A cutter mechanism as defined in claim 1 further characterized by said knife being elongated in the direction of said knife axis, means supporting said knife for rotation about said knife axis, and a swivel means connecting said intermediate link to said knife to permit said knife to be rotated about said knife axis without rotating said intermediate link.

4. A cutter mechanism as defined in claim 3 further characterized by said knife being supported for movement along said knife axis by a guide and means permitting said knife to slide along said knife axis relative to said guide while restraining said knife against rotation relative to said guide about said knife axis, a supporting frame, means supporting said guide from said frame so as to permit rotation of said guide relative to said frame and to restrain said guide against movement relative to said frame along said knife axis, said knife having a free end opposite from its end to which said intermediate link is connected and which free end extends beyond said frame, a subframe relative to which said crank and pivot axes are fixed, means slidably supporting said subframe on said frame for movement of said subframe relative to said frame along said knife axis, and means for moving said subframe relative to said frame along said knife axis to control the amount by which said free end of said knife moves beyond said frame during each of its strokes.

5. A cutter mechanism as defined in claim 1 further characterized by means for connecting said connecting link and said intermediate link to said crossarm for pivotal movement of both said connecting link and said intermediate link relative to said crossarm about a common connection axis fixed relative to said crossarm, said connecting link and said intermediate link.

6. A cutter mechanism as defined in claim 5 further characterized by said crank axis and said connection axis both being arranged so as to substantially intersect said knife axis.

7. A cutter mechanism as defined in claim 5 further characterized by the distance between said pivot axis and said connection axis, as measured perpendicular to said knife axis, being greater than the diameter of said circular path of said drive pin.

8. A cutter mechanism as defined in claim 1 further characterized by means connecting said intermediate link to said crossarm for pivotal movement relative to said crossarm about a second pivot axis fixed relative to said crossarm and said intermediate link, the radius of the circular path of said drive pin, the displacement between said crossarm pivot axis and said second pivot axis, the displacement between said crossarm pivot axis and the point of connection of said connecting link to said crossarm, and the location of said crossarm pivot axis being such that said second pivot axis remains substantially on said knife axis as said crossarm is oscillated by said connecting link.

* * * * *